United States Patent
Fromme

[15] 3,683,441
[45] Aug. 15, 1972

[54] VEHICLE CLEANING DEVICE

[72] Inventor: Richard H. Fromme, 71467 Estellita Drive, Rancho Mirage, Calif. 92270

[22] Filed: Jan. 13, 1970

[21] Appl. No.: 2,459

[52] U.S. Cl. ................................... 15/97, 15/DIG. 2
[51] Int. Cl. ............................................... B60s 3/06
[58] Field of Search ......... 15/101, 97, 102, 4, DIG. 1, 15/DIG. 2; 134/9, 6

[56] References Cited

UNITED STATES PATENTS

| | | | |
|---|---|---|---|
| 1,831,684 | 11/1931 | Petersen | 15/101 |
| 3,118,161 | 1/1964 | Cramton | 15/179 |
| 3,510,898 | 5/1970 | Tatara et al. | 15/DIG. 2 |
| 1,636,082 | 7/1927 | Stevens | 15/97 |
| 3,263,341 | 8/1966 | Allen | 15/97 X |
| 3,499,180 | 3/1970 | Harwitz | 15/97 |
| 3,517,405 | 6/1970 | Hanna et al. | 15/97 |

OTHER PUBLICATIONS

Consumer Reports, June 1968, Vol. 33, No. 6, p. 305.

*Primary Examiner*—Leon G. Machlin
*Attorney*—Christensen, Sanborn and Matthews

[57] ABSTRACT

This rotary mopping device to remove residual dirt and scum from top and upper side surfaces of an automobile in a machine-wash establishment comprises a multiarm rotor, with each arm supporting an array of mop-like strips hung at a succession of points along the length of the arm and graduated in length as a function of radial position along the arm. With the outermost strips being the longest and being so located in terms of radial distance from the upright rotation axis of the rotor as to lie beyond the sides of the widest automobile to be washed. Preferably in each array there are two strips of different length at each of the successive mounting points along the length of the arm, with the leading strips being the shorter of the two.

7 Claims, 4 Drawing Figures

PATENTED AUG 15 1972

3,683,441

INVENTOR.
RICHARD H. FROMME
BY
Christensen Sanborn & Matthews
ATTORNEYS

VEHICLE CLEANING DEVICE

DESCRIPTION

This invention relates to improvements in automatic or machine automobile washing systems and more particularly concerns an improved mechanical wiping or mopping device for removing films and particles of dirt not readily disposed of by water jets and detergent on the top and upper side surfaces of the vehicle body. The invention is herein illustratively described by reference to the presently preferred embodiments thereof; however, it will be evident that certain modifications and changes therein with respect to details may be made without departing from the essential features involved.

A broad object of the invention is to provide a safer, less expensive, less troublesome, and more effective mechanical means to wipe and clean the top and upper side surfaces of an automobile than the usual or conventional upper rotary brush device which turns at relatively high speed on a horizontal axis extending transversely of the line of travel and which has to be moved up and down as vehicles are moved beneath it.

A further object hereof is to provide such a means which will effectively reach substantially all mechanically cleanable side and top surfaces of an automobile without damaging windshield wipers, radio antennae and other attachments.

A still further object hereof is to provide a long-wearing wiping or mopping device which will not damage paints and lacquers or chrome strips and which will not catch on or be torn by corners, crevices and irregular surfaces of the automobile.

Another object is to provide a single rotary means which will mechanically mop or wipe both top and adjoining lateral (as well as front and rear) upper side surface areas of a vehicle, which typically requires three conventional rotary brushes, one for each side and one for the top.

A specific object hereof is to provide a mechanical rotary mopping or wiping device for use in car wash establishments which avoids the problems and expense of the usual mechanisms required for raising and lowering an upper rotary brush assembly so as to accommodate the differing heights of vehicles and to follow the vertical contour of a vehicle as it moves past the device. With the present invention the rotary support assembly for the mop-like strips can remain at fixed height above the floor or underlying conveyance supporting the cars and, due to the special action and capability of the suspended strips, the different top and upper side surface areas of each vehicle are wiped effectively independent of their height above the floor, and without necessity of making height adjustments for vehicles of different maximum or minimum height. Therefore, not only is the rotary, mop-like assembly itself relatively inexpensive to construct, but the associated apparatus required for its support and operation is much simpler and less expensive than conventional associated or supportive apparatus.

Another specific object of the invention is to devise a rotary mop-like configuration of strips and supporting means therefor operable in accordance with the foregoing objectives and incorporating special design features which eliminate or minimize any tendency for entanglement of the mop-like strips with each other or piling up of the strips in such a manner as to nullify their effectiveness. With the special design features herein disclosed, the mop-like strips, while acting cooperatively do not interfere with each other nor require any special attention from a human operator or machine to remain effective.

Described in brief terms, the invention comprises one or more overhead rotary wiping or mopping devices each of which turns continuously on an upright axis approximately centered in relation to the line of travel of the vehicle through a car washing establishment. If more than one such device is employed in a given establishment, it is preferred that the rotary devices turn in relatively opposite directions so as to further enhance the effectiveness thereof by wiping the various surfaces reached in different directions. Each such device as disclosed comprises a plurality of angularly spaced arms or equivalent support means from each of which are suspended a plurality of mop-like strips preferably arrayed in pairs along the arm's length. Matted or woven polypropylene carpeting material such as is conventionally used in so-called indoor-outdoor carpeting and the like is preferred as the strip material. Preferably the outermost strips or pairs of strip material. Preferably the outermost strips or pairs of strips on the arms are the longest with the succeeding strips located inwardly along the arms being graduated downward in length. Also the circumferentially leading strip of each pair is preferably shorter than the strip which lags. As a result of thus graduating the strip lengths, both circumferentially and radially of the arms, the strips are effective to reach the side surfaces as well as the top surfaces and to wipe those surfaces without tangling, interfering with each other, or piling up. Moreover, by having the outermost strips of each array at a radial distance from the axis of rotation exceeding half the width of the widest automobile, each area of the upper side surfaces of the vehicle are reached and wiped in one direction as strips drop off the top surfaces by gravity during their laterally outward motion and are wiped at another point of time and in a different direction (i.e. by upward and inward sliding motion) on the laterally inward movement of strips as the arrays continue to rotate accompanying forward progress of the vehicle.

These and other features, objects and advantages of the invention will become more fully evident from the following description with reference to the accompanying drawings.

FIG. 2 is a front elevation view showing the rotary mop assembly and a typical support structure therefor as it is being approached by an automobile viewed head-on.

Figure 1:
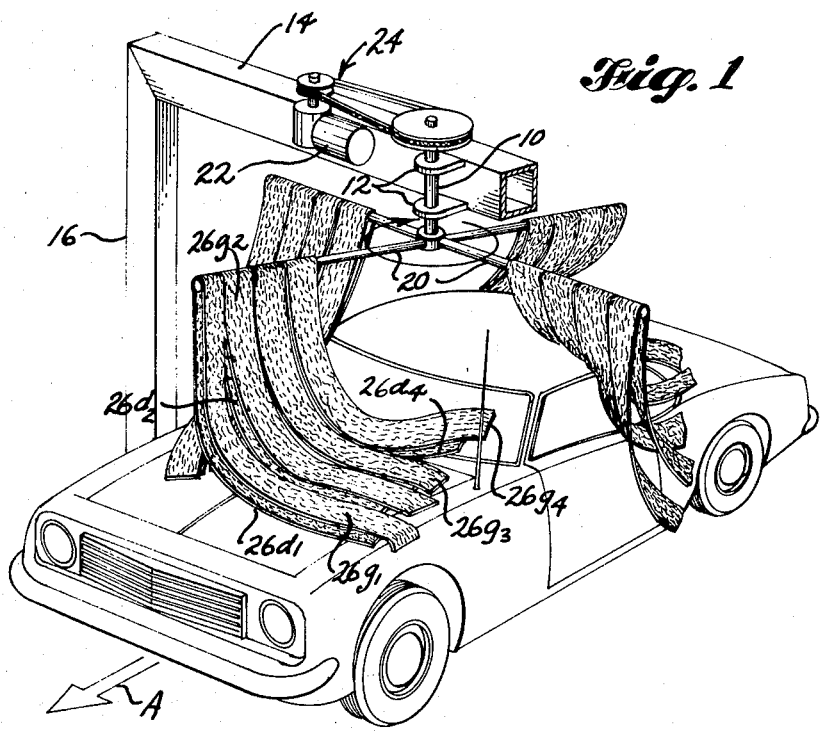
FIG. 1 is an isometric view of a rotary mop assembly according to this invention, the device being shown in operative position relative to an automobile.
Figure 2:
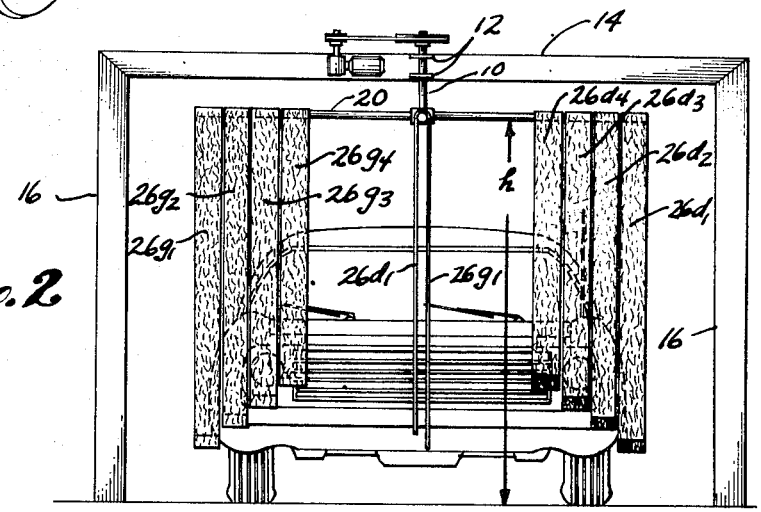
Figure 3:
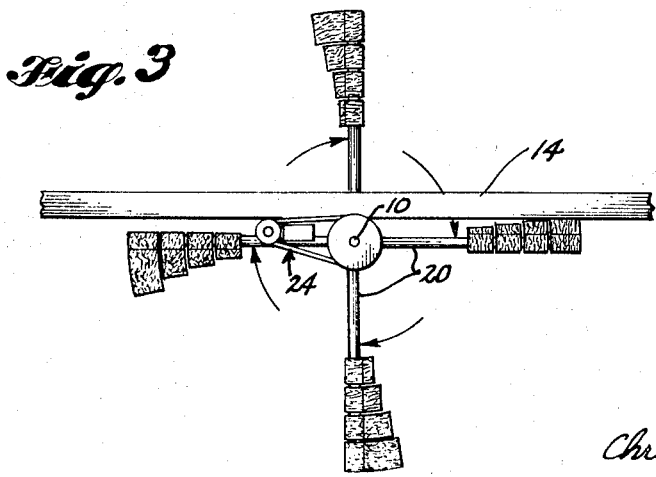
FIG. 3 is a top view of the rotary mop assembly with portions of the support structure broken away for convenience in illustration.

Referring to FIGS. 1, 2 and 3, the illustrated rotary mop assembly comprises an upright spindle or shaft 10 rotatively mounted on a vertical axis by supports 12 which are carried by a horizontal overhead beam 14. Supported by end posts 16 the beam 14 provides a transverse overarching structure which overlies the path of movement of automobiles being carried through the vehicle washing establishment. The means of conveyance and various necessary items of equipment such as water jets, wheel brushes, etc. are omitted from the drawings.

In FIG. 1 the arrow A depicts the path of motion of an automobile beneath the support beam 14. The rotor spindle 10 carries radial arms 20, four in this case, of equal length and distributed at equal angles to each other about the rotary axis of the spindle. The spindle is driven by any suitable means such as the geared electric motor unit 22 drivingly connected to the spindle through the belt and pulley drive 24 as shown. Rotation of the spider formed by the arms 20 is slow by comparison with the usual transverse top brush assembly which typically has limp strands that are radially projected by centrifugal force at the required speed of rotation. In this case rotary mop speed is kept just below that which would develop a centrifugal force in the suspended strips sufficient to cause them to swing appreciably outwardly in the vertical planes of their respective supporting arms.

Each arm 20 has a plurality of pairs of strips suspended therefrom in an array extending over the outer portion (approximately half) of its length. Thus, at or near the outer end of each arm is a pair of strips comprising a circumferentially leading strip 26d1 and an associated lagging strip 26g1 which is somewhat longer in length (by approximately four inches in a typical case) than the strip 26d1. Immediately adjacent to the outer strips 26d1 and 26g1 is a succeeding pair of strips comprising a leading strip 26d2 and lagging strip 26g2. Typically, the strips 26d2 and 26g2 are respectively shorter by approximately 6 inches than the strips 26d1 and 26g1. Similar pairs of strips 26d3, 26g3, and 26d4, and 26g4 are suspended from each arm at successive locations inwardly along the length of such arm and in turn are shorter by several inches than each corresponding strips of the associated pair immediately preceding the same in location along the arm. The graduation of strip lengths appears clearest in FIG. 2.

As previously stated, the strips preferably comprise polypropylene carpeting material. However, other flexible textured materials which will mop and wipe without scratching a painted surface can be used. Each pair of strips is conveniently formed by draping a length of such polypropylene material over the arm at an intermediate point along the length of the strip and adjusting the relative lengths of the portions thereby suspended to a difference of about four inches so as to provide a leading strip which is slightly shorter than the lagging strip of each pair. The strips are then riveted or otherwise suitably secured in position on the respective arms in succession of positions along the arms, the pairs graduating downward in length inwardly of their supporting arms. Approximately the inner half of the length of each arm is free; that is, is not required to support the suspended mop-like strips in order to achieve the described functions, and in fact it is preferred to maintain a clear central area so as to avoid or minimize any tendency for the strips to tangle or pile up beneath the central portion of the rotor. It is found that the graduated lengths of the strips facilitates the outermost strips to dropping freely off the car's upper surfaces and sweeping down over the adjoining side surfaces as they do so without interference from strips located further inward on the arms. It is found that making the lead strip of each pair shorter than its mate also facilitates maintaining interference-free action of the strips. After the strips drop off the top surface they hang relatively straight and then trail and drag upward along and over the oncoming side and top surfaces during the transverse inward movement of the strips over the vehicle as shown in the left-hand portion of FIG. 1.

Figure 4:
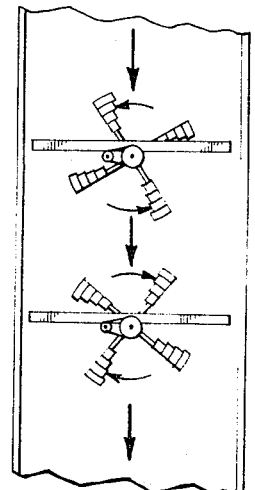
FIG. 4 is a plan view at reduced scale showing two rotary mop assemblies located in successive positions along the path of travel of automobiles through an automobile wash establishment, illustrating the relatively opposite directions of rotation of the two mop devices in that case.

It will be evident that the different side surface areas and adjoining top surface areas of the automobile are mopped first by an upward then transverse-inward stroking motion and thereafter by a downward and transverse-outward stroking motion (i.e. in a relatively opposite direction). The long and water-sogged strips thus drawn over all surfaces in different directions are very effective to remove any films or particles of dirt on the surfaces. This multidirectional mopping action is enhanced so as to provide even more effective wiping or cleaning when two such rotary assemblies are provided in the car wash establishment and one assembly is driven oppositely from the other assembly, as depicted in FIG. 4. With this arrangement it is found that the combined effect of the two assemblies is something greater than the sum of the anticipated effects of each assembly acting individually.

While the drawing does not illustrate auxiliary apparatus used in a typical car wash establishment, it will be understood, of course, that water jets and preferably detergent ejection apparatus associated therewith will ordinarily be used first in order to thoroughly rinse and remove the readily detached dirt particles and scummy materials on the surfaces. Any residues will also be loosened and softened in the same process, that is prior to the point at which the disclosed rotary mop assembly comes into action. Beyond the point when the rotary mop assembly has operated, the vehicle may again encounter water jets and/or other cleaning devices. At the location of the rotary mop assembly it is possible to provide water jets but it is usually not necessary, and if they are used it is desirable that the forces involved and the amount of water caused to flow over the surfaces of the vehicle not be so great as to float the mop-like strips out of physical wiping or mopping contact with the surfaces which they should reach.

As shown in FIG. 2 the height H of the rotary spider assembly which supports the mop-like strips preferably exceeds that of the highest vehicle to pass beneath the device and the hanging lengths of the pairs of strips is then sufficient that even the lowest surfaces of the lowest or smallest vehicle to be scrubbed will be reached, whereas the highest surfaces of the highest vehicles will also be effectively wiped and cleaned by the device. In other words, the height H in a given installation may be fixed and it is therefore not necessary to provide the usual complicated and expensive mechanism for raising and lowering a mechanical wiping or brushing assembly as in conventional installations.

Also, inasmuch as the widest vehicle typically moved through an automobile washing establishment is less than eight feet in width (usually because of highway department standards), it is sufficient that the diameter of the rotary spider be of the order of nine to ten feet. This diametric dimension is preferably established at the minimum value which is sufficient to enable one or two of the outermost pairs of mop-like strips to act upon the lateral side surfaces of the vehicle being cleaned.

It will be recognized, of course, that the number of arms in the rotary spider (four in the example) may vary and that the number of strips suspended from the individual arms, and the widths and lengths of these strips may also vary within the broad concepts of the invention. The kinds of material that may be used in the strips are also open to choice or design, keeping in view the desired properties of durability, nonabrasiveness to vehicle finishes, nonfrayability, and effective mopping characteristics.

What is claimed is:

1. Automobile washing apparatus for use in a machine wash establishment through which automobiles are moved along a defined path, said apparatus comprising a rotor assembly, means to advance an automobile progressively lengthwise along said path to, beneath and beyond said rotor assembly, means mounting said rotor assembly to turn on a vertical axis in an elevated position above and approximately centered laterally in relation to said path, said rotor assembly comprising a plurality of mop strips of limply flexible organic material relatively thin and wide in cross-section freely suspended into the path of an automobile from said rotor assembly from different locations thereon above the automobile and varying in their radial distances from said axis, the radially outermost strips hanging lower than the radially innermost strips, the rotation paths of the suspension locations of the redially innermost strips lying laterally at all times within the space between and above the sides of the automobile and the rotating paths of the suspension locations of at least the radially outermost strips ranging laterally beyond the opposite sides of the automobile, said outermost strips adapted to slide freely down and off the sides of the automobile and to be drawn back against the same so as to slide up and over the automobile in the course of their rotation, and means operable to turn said rotor assembly unidirectionally about said axis as an automobile is being progressively advanced to, beneath and beyond the same along said path, the turning speed being maintained below speeds at which centrifugal force tends to swing the strips radially outward materially in their rotation.

2. The apparatus defined in claim 1, wherein the strips comprise polypropylene fiber mat material.

3. The apparatus defined in claim 2, wherein the strips are suspended in a plurality of radially extended angularly spaced arrays with the individual suspended strips oriented with their width dimensions oriented substantially in the planes of their respective arrays.

4. The apparatus defined in claim 3, wherein the strips graduate in length along the arrays.

5. The apparatus defined in clam 4, wherein each array of strips comprises two radially extending rows of strips, with the strips in the array rows leading in the direction of rotation not hanging as far down as the respective strips which follow behind them.

6. The apparatus defined in claim 1 further comprising a second similarly defined rotor assembly similarly mounted in relation to said path at a position succeeding the first-mentioned rotor assembly along said path, and means to turn the second rotor assembly unidirectionally in a direction opposite the turning of the first rotor assembly and at approximately the same rotational speed.

7. The apparatus defined in claim 6, wherein at least certain of the strips are closely followed in their rotation paths by companion strips which hang lower than do said certain strips respectively in the rotor assembly.

* * * * *